(12) United States Patent
Chen et al.

(10) Patent No.: US 8,707,082 B1
(45) Date of Patent: Apr. 22, 2014

(54) METHOD AND SYSTEM FOR ENHANCED GRANULARITY IN FENCING OPERATIONS

(75) Inventors: Grace Chen, Sunnyvale, CA (US); Indumathi Shankar, Los Altos, CA (US)

(73) Assignee: Symantec Corporation, Mountain View, CA (US)

( * ) Notice: Subject to any disclaimer, the term of this patent is extended or adjusted under 35 U.S.C. 154(b) by 541 days.

(21) Appl. No.: 12/608,681

(22) Filed: Oct. 29, 2009

(51) Int. Cl.
*G06F 11/00* (2006.01)

(52) U.S. Cl.
USPC .......................................... 714/4.1; 707/790

(58) Field of Classification Search
USPC .............................................................. 714/4
See application file for complete search history.

(56) References Cited

U.S. PATENT DOCUMENTS

| | | | | |
|---|---|---|---|---|
| 5,555,177 | A * | 9/1996 | Simmons | 700/121 |
| 6,609,213 | B1 * | 8/2003 | Nguyen et al. | 714/4.12 |
| 6,934,880 | B2 * | 8/2005 | Hofner | 714/10 |
| 7,346,801 | B2 * | 3/2008 | Brunelle et al. | 714/4.5 |
| 7,464,378 | B1 | 12/2008 | Limaye et al. | 718/100 |
| 7,631,066 | B1 * | 12/2009 | Schatz et al. | 709/224 |
| 7,657,034 | B2 * | 2/2010 | Volp et al. | 380/268 |
| 7,831,833 | B2 * | 11/2010 | Gaylor | 713/176 |
| 7,849,303 | B2 * | 12/2010 | Miller | 713/150 |
| 7,933,869 | B2 * | 4/2011 | Becker et al. | 707/625 |
| 2003/0079100 | A1 * | 4/2003 | Williams et al. | 711/165 |
| 2003/0097610 | A1 * | 5/2003 | Hofner | 714/10 |
| 2004/0153711 | A1 * | 8/2004 | Brunelle et al. | 714/4 |
| 2005/0120025 | A1 | 6/2005 | Rodriguez et al. | 707/10 |
| 2005/0132379 | A1 | 6/2005 | Sankaran et al. | 718/105 |
| 2005/0259572 | A1 | 11/2005 | Esfahany et al. | 370/217 |
| 2005/0268154 | A1 * | 12/2005 | Wipfel et al. | 714/4 |
| 2005/0283641 | A1 * | 12/2005 | Clark et al. | 714/4 |
| 2006/0047776 | A1 | 3/2006 | Chieng et al. | 709/217 |
| 2006/0085695 | A1 | 4/2006 | Shrivastava et al. | 714/47 |
| 2007/0067318 | A1 | 3/2007 | Wolafka et al. | 707/100 |
| 2007/0168507 | A1 * | 7/2007 | Das et al. | 709/225 |
| 2008/0162622 | A1 * | 7/2008 | Becker et al. | 709/201 |
| 2008/0162660 | A1 * | 7/2008 | Becker | 709/213 |
| 2009/0006888 | A1 | 1/2009 | Bernhard et al. | 714/6 |
| 2009/0327311 | A1 * | 12/2009 | Becker | 707/10 |
| 2010/0125550 | A1 * | 5/2010 | Imamura et al. | 707/613 |
| 2011/0041004 | A1 * | 2/2011 | Miwa et al. | 714/5 |
| 2011/0106802 | A1 | 5/2011 | Pinkney et al. | 707/737 |

* cited by examiner

*Primary Examiner* — Kamini Patel
(74) *Attorney, Agent, or Firm* — Campbell Stephenson LLP

(57) ABSTRACT

A key set is registered. The registering the key set includes registering a first shared data resource key. The first shared data resource key includes a first identifier associating a first process with a first shared data resource. The registering the key set further includes registering a second shared data resource key, and the second shared data resource key includes a second identifier associating a second process with a second shared data resource. A failure of a first process is detected, and in response to the detecting the failure of the first process, the first shared data resource key is de-registered. The second shared data resource key remains registered after the de-registering the first shared data resource key.

22 Claims, 8 Drawing Sheets

METHOD AND SYSTEM FOR ENHANCED GRANULARITY IN FENCING OPERATIONS

BACKGROUND

Distributed computing systems are an increasingly important part of research, governmental, and enterprise computing systems. Among the advantages of such computing systems are their ability to handle a variety of different computing scenarios including large computational problems, high volume data processing situations, and high availability situations. For applications that require the computer system to be highly available, e.g., the ability to maintain the system while still providing services to system users, a cluster of computer systems is a useful implementation of the distributed computing model. In the most general sense, a cluster is a distributed computer system that works together as a single entity to cooperatively provide processing power and mass storage resources. With a cluster, the processing load of the computer system is typically spread over more than one computer, thereby eliminating single points of failure. Consequently, programs executing on the cluster can continue to function despite a problem with one computer in the cluster. In another example, one or more computers of the cluster can be ready for use in the event that another computer in the cluster fails. While each computer in a cluster typically executes an independent instance of an operating system, additional clustering software is executed on each computer in the cluster to facilitate communication and desired cluster behavior.

SUMMARY

A key set is registered. Registering the key set includes, in one embodiment, registering a first shared data resource key. In this embodiment, the first shared data resource key includes a first identifier associating a first process with a first shared data resource. Registering the key set further includes registering a second shared data resource key, and the second shared data resource key includes a second identifier associating a second process with a second shared data resource. A failure of a first process is detected, and in response to detecting the failure of the first process, the first shared data resource key is de-registered. The second shared data resource key remains registered after the de-registering the first shared data resource key.

In one embodiment, in response to detecting a failure of a node, a shared coordinator resource key associated with a shared coordinator resource is de-registered.

In one embodiment, the shared coordinator resource stores system administrative data, such as a key set. Registering the key set further includes generating in a user space a data structure, which in some embodiments is called a dependency table, including a first mapping between the first process and the first shared data resource, and a second mapping between the second process and the second shared data resource. Registering the key set further includes storing on the shared coordinator resource the first shared data resource key, the second shared data resource key, and the shared coordinator resource key.

In one embodiment, detecting the failure of the node includes detecting a loss of a heartbeat signal. The heartbeat signal is transmitted across a private network connection, and the heartbeat signal is from the node.

In one embodiment, a shared coordinator resource key remains registered after de-registering the first shared data resource key. The first shared data resource key further includes a fourth identifier associating a node with the first shared data resource. The first shared data resource stores first user data. The second shared data resource key further comprises a fifth identifier associating the node with the second shared data resource. The first shared data resource key further includes a sixth identifier associating the first shared data resource and a protocol version applicable to a sixth shared data resource. The second shared data resource stores second user data.

In one embodiment, detecting the failure of the first process includes detecting a process failure indicator associated with the failure of the first process, and the detecting the failure of the first process further includes detecting the heartbeat signal.

In one embodiment, registering the key set further includes registering a shared coordinator resource key. The shared coordinator resource key includes a third identifier associating the node with the shared coordinator resource. The process failure indicator is a failure of the process to respond to a kill process command. In response to the detecting a failure of the node, the first data disk key and the second data disk key are de-registered.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
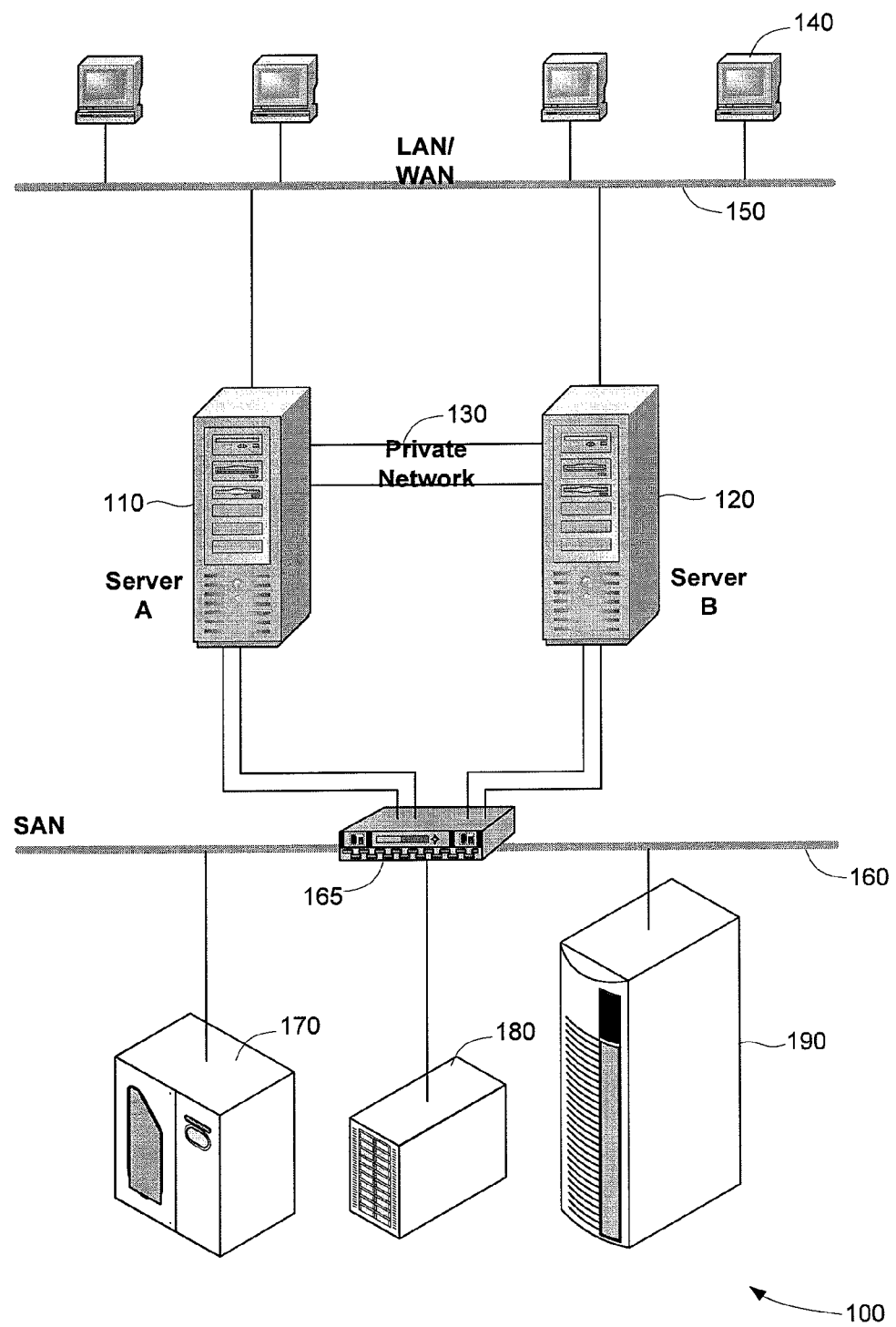
FIG. 1 is a simplified block diagram of a computer system cluster.

In a cluster environment, current solutions allow for the isolation of a failed node. When a node is isolated in response to a failure, all of the shared resources (e.g., coordinator disks and data disks) allocated to the node can then be reallocated (by de-registering on the coordinator disk any keys allocating to the node the coordinator disks and data disks) and the node can be restarted. Node isolation assumes (or, alternatively, causes) the failure of all processes executing on the node. Unfortunately, the isolation of an entire node and the cancellation of all processes operating on the node does not reflect or support the reality of nodes executing multiple processes (such as multiple applications or multiple virtual environments). Users of a healthy process executing on a node that is also executing a failed process express significant dissatisfaction at the loss of service resulting from isolation and shutdown of a node that is running a healthy process in addition to a failed process.

For instance, some nodes execute a set of multiple processes, one of which may hang or crash. If one of the processes or virtual environments executing on a particular node hangs or crashes, the only available solution to reset the hung process or virtual environment and reallocate its resources is to isolate the entire node and all of its processes. This results in the loss of healthy processes currently executing on the node, creating unnecessary service interruptions through the loss of the healthy processes.

A mechanism is provided for the detection of failures at the process level, thereby allowing a cluster to selectively isolate, reset and reallocate the resources associated with particular failed processes, rather than an entire node. In one embodiment, the present invention thereby minimizes the likelihood of significant cost or inconvenience resulting from a service interruption a service interruption in a healthy process through the use of a series of methods and structures.

A bifurcated key set is created and registered. A first type of key associates a coordinator disk with a node. A second type of key associates a data disk with a node and a process. Both types of keys are registered with a coordinator disk. Registration is achieved by storing a key on the coordinator disk. A system of bifurcated failure detection is provided. Node failure is detected through, in one embodiment, the loss of heartbeat messages from the failed node on a private network link. Process failure is detected through the receipt of a process failure indicator, which is a triggering signal from one of a series of algorithms for monitoring process health. A system of bifurcated enforcement is provided. Node failure is addressed by de-registering from a coordinator disk all keys associated with a failed node, so that the coordinator disk and all of data disks associated with the failed node can be reallocated. Process failure is addressed by de-registering from a coordinator disk all data disk keys associated with a failed process, so that the coordinator disk and all of data disks associated with a healthy process remain allocated to the node and process, respectively, while the data disks associated with the failed process are de-registered and can be reallocated.

The computer on the average user's desk has opened up the world in incredible ways over the course of the last 15 years. Users can now receive goods, services, and information from anywhere in the world and can generally transact business at any time of the day or night.

This revolution in commerce and knowledge has been, to a substantial degree, enabled by two concepts. The first is the concept of a network. At its simplest, a network is a connection (analogous to a telephone line) between two computers. In a simple example, if a user wants a score from a football game, the user can tell the computer on his or her desk to contact the computer at the local TV station and request a file containing the sports scores for the evening. The file containing the sports scores is usually returned in the form of a web page containing the requested scores, as well as graphics and video related to the games that the station wants to promote. More complex networks, reaching around the globe, enable computers all over the world to share data. Most users are aware of networks, frequently because they had a role in connecting their computer to the network. The network is a concept with which the user interacts directly.

The other concept that has enabled the revolution in commerce and knowledge over the past 15 years is the concept of clustering. Because the user typically has no direct interaction with the components of a cluster as separate entities, the existence of the cluster is entirely transparent and unknown to the user. The concept of a cluster builds on the concept of a network to allow a group of computer systems to act in a coordinated manner and fulfill requests. One type of clustering is most easily explained in terms of the operation of a fast food restaurant. When a user drives up to a drive-through window and orders a burger, French fries and a milk shake, the user interacts with (and sometimes sees only) one person at the window. The user does not interact with and frequently does not see a group of multiple people working to fill the order. A first person operates the cash register and takes orders. A second person cooks the French fries and operates the soft serve ice cream machine to make the milkshake. A third person cooks the hamburger. A fourth person cleans the restaurant and packages orders before handing them to the first person at the window.

In computing, a cluster can exhibit an analogous division of labor. Returning to the example of a user requesting sports scores from the computer at a local television station, there may be a cluster of computers used to answer the request, but that cluster may be entirely invisible to the user. Just as there are four people involved in serving a fast food order, a computing system cluster can be composed of a first machine that takes orders and sends completed files, a second machine that supplies video and pictures in the completed file, a third machine that provides storage for all of the elements of the completed file. There can be a fourth machine that handles network security by making sure that files are sent only to authorized users. When the machines of a cluster work well together, they may be entirely invisible to the user. FIG. 1 provides an example of a clustered system (only two machines) on a network.

FIG. 1 illustrates a simplified example of a cluster 100. The members of the cluster include server A 110 and server B 120. As members of cluster 100, servers 110 and 120 are often referred to as "hosts" or "nodes." Another common feature of a cluster is the ability of the nodes to exchange data. In the example of FIG. 1, servers 110 and 120 can exchange data over network 150, typically a local area network (LAN), e.g., an enterprise-wide intranet, or a wide area network (WAN) such as the Internet. Additionally, network 150 provides a communication path for various client computer systems 140 to communicate with servers 110 and 120.

Returning to the sports scores example, discussed above, a user at client 140 could send a request for sports scores to server A 110 over network 150. Server A 110 could then generate a file containing the requested sports scores and graphics that are provided by server B 120. Server A could then send the file containing the requested scores and the graphics over network 150 to client 140. Each task that a node is performing is an example of a concept referred to as a process. Thus, in the "sports score" example, server A 110 is running a "file generating process" and a "file sending process." Server B 120 is running a "graphics process."

In addition to network 150, servers 110 and 120 can also communicate with each other over private network 130. As shown, private network 130 is only accessible by cluster nodes, i.e., server A 110 and server B 120. To support the high availability of cluster 100, private network 130 typically includes redundancy such as two network paths instead of one. Private network 130 is used by the nodes for cluster service message passing including, for example, the exchange of so-called "heart-beat" signals. Heartbeat signals are, in one embodiment, packets containing messages indicating that a node is currently available to the cluster and functioning properly.

Other elements of cluster 100 include storage area network (SAN) 160, SAN switch 165, and storage devices such as one or more of tape library 170 (typically including one or more tape drives), one or more groups of disk drives 180 (i.e., "just a bunch of disks" or "JBOD"), and one or more of intelligent storage array 190. These devices are examples of the type of storage used in cluster 100. Other storage schemes include the use of shared direct-attached storage (DAS) over shared SCSI buses. SAN 160 can be implemented using a variety of different technologies including fibre channel arbitrated loop (FCAL), fibre channel switched fabric, IP networks (e.g., iSCSI), Infiniband, etc.

SAN switch 165 and storage devices 170, 180, and 190 are examples of shared resources. The most common shared resource in a cluster is some form of shared data resource, such as one or more disk drives. Using a shared data resource gives different nodes in the cluster access to the same data, a feature that is common for most cluster applications. Although a disk device is perhaps the most common example of both a shared resource and a shared data resource, a variety of other types of devices will be well known to those having ordinary skill in the art. Moreover, although servers 110 and 120 are shown connected to storage array storage devices through SAN switch 165 and SAN 160, this need not be the case. Shared resources can be directly connected to some or all of the nodes in a cluster, and a cluster need not include a SAN. Alternatively, servers 110 and 120 can be connected to multiple SANs. Additionally, SAN switch 165 can be replaced with a SAN router or a SAN hub.

Just as a major problem can arise in a fast food restaurant if one of the workers is not performing his or her duties, problems can arise in a cluster if one of the nodes fails to execute the tasks assigned to it. In a cluster environment, current solutions allow for the isolation of a failed node. This is roughly analogous to dismissing a worker who is not doing his or her job. Typically, the chief indicator that a node has failed is the loss of the node's heartbeat signals across private network 130. When a node is isolated in response to a failure, all of the resources assigned to the node are reassigned to other nodes in the cluster. This is roughly analogous to assigning the cash register to another worker if the worker currently operating the cash register has to be dismissed.

In the environment of a cluster operating system, the primary resource assigned to nodes is storage, such as group of disk drives 180, for storing information. Typically, a group of disk drives (also called "disks") will be assigned to a node. If the node fails, the disks are reassigned to another node. Two types of disk are relevant to the current discussion. Data disks are used for storing user data (for example, sports scores) and coordinator disks are used for storing cluster system administrative data (e.g., data for performing administrative functions such as tracking which nodes are using which disks).

Tracking the assignment of a disk drive to a node is most easily explained in terms of tracking the assignment of a register to a worker in a modern restaurant. In the restaurant, the employee who is operating the cash register will typically log in to the cash register by swiping a key card or entering an ID code, or both. If an employee is dismissed, a newly-selected employee can log the previous employee out of the cash register, and the newly-selected employee can log in to the cash register. In a clustered storage system, a node declares its ownership of a disk in a very similar manner, by depositing a "key" on a coordinator disk. The key is a short file that contains information about the node that owns the disk. The coordinator disk will store a key indicating which node owns the coordinator disk and will also store keys indicating which node owns each of the data disks that are associated with the coordinator disk.

When a node fails, resources (for example, coordinator disks and data disks) assigned to the node can then be reassigned by erasing any keys assigning to the failed node the coordinator disks and data disks, and the node can be restarted. Restarting a node, which is part of the process of node isolation, works reasonably well for situations in which the node is doing one thing, and the node is failing at that one thing, and the node is not doing anything else.

A more complex problem, which is addressed by the present invention, is created when a node is doing multiple things at one time. It was previously mentioned that, in the "sports score" example, server A 110 is running a "file generating process" and a "file sending process." Server B 120 is running a "graphics process." The presence of multiple processes on a single node can cause problems, as described below.

Returning to the example of the fast food restaurant, the second person cooks the French fries and operates the machine that makes the milkshake. Imagine that this second person is doing a horrible job at milkshakes, but does a splendid job at operating a deep fryer. Thus, the "deep fryer process" is working well and the "milkshake process" has failed. In such a situation, the manager of the restaurant has the option to either 1.) dismiss the employee and hope that the new employee to whom the deep fryer and the milkshake machine are assigned can execute both processes simultaneously or 2.) reassign the milkshake machine and let the employee continue to do splendid work with the deep fryer process.

Using the technology that existed before the present invention, which relies exclusively on node-level heartbeat messages to determine when a node should be dismissed and its resources should be reassigned, it was impossible for the operator of a cluster to close down a failed process on a node while leaving a working process in operation. For instance, some nodes execute a set of multiple processes, one of which may hang or crash. If one of the processes executing on a particular node hung or crashed, the only available solution was to reset the hung process is to isolate the entire node and cancel all of its processes. This node-wide shutdown resulted in the loss of healthy processes currently executing on the node, creating unnecessary service interruptions through the loss of the healthy processes.

Given the choice, users would prefer to keep healthy processes alive and end failed processes. Unfortunately, the technology that existed before the present invention required that, in order to shut down a failed process on a node, a cluster must shut down the healthy processes running on the node. In the world of clustered computer systems, failure on the milkshake process could shut down the deep fryer process. Users waiting on the healthy process, which was shut down to accommodate the need to shut down the failed process, were displeased with the service outages that resulted.

The present invention, in one embodiment, detects failures at the process level and failures at the node level, rather than relying exclusively on failure at the node-level. In response to a node-level failure, all resources associated with a node are re-allocated. In response to a process-level failure, the resources associated with failed individual processes, rather than the entire node, are reallocated.

This process involves several steps and structures. The first step is the creation of a key set with multiple types of keys. A first type of key associates a coordinator disk with a node. A second type of key associates a data disk with a node and a process. Keys are data structures that are, during operations that access a shared resource, checked to confirm that the entity performing the operation has a legitimate claim to access the resource. The first type of key is used to verify the access of a particular node to a coordinator disk. The second type of key is used to verify the access of a particular process to a data disk.

The second step is a system of detection that allows separate detection of node-level failures and process-level failures. Node failure is detected through the loss of heartbeat messages from the failed node on a private network link. Process failure is detected through a series of algorithms for monitoring individual process health, which are called triggers. The third step is a system of multiple enforcement mechanisms. Node failure is addressed by de-registering from a coordinator disk all keys associated with a failed node, so that the coordinator disk and all of data disks associated with the failed node can be reallocated. Process failure is addressed by de-registering from one or more coordinator disks all data disk keys associated with a failed process, so that the coordinator disk and all of data disks associated with a healthy process remain allocated to the node and process, respectively, while the data disks associated with the failed process are de-registered and can be reallocated.

Figure 2A:
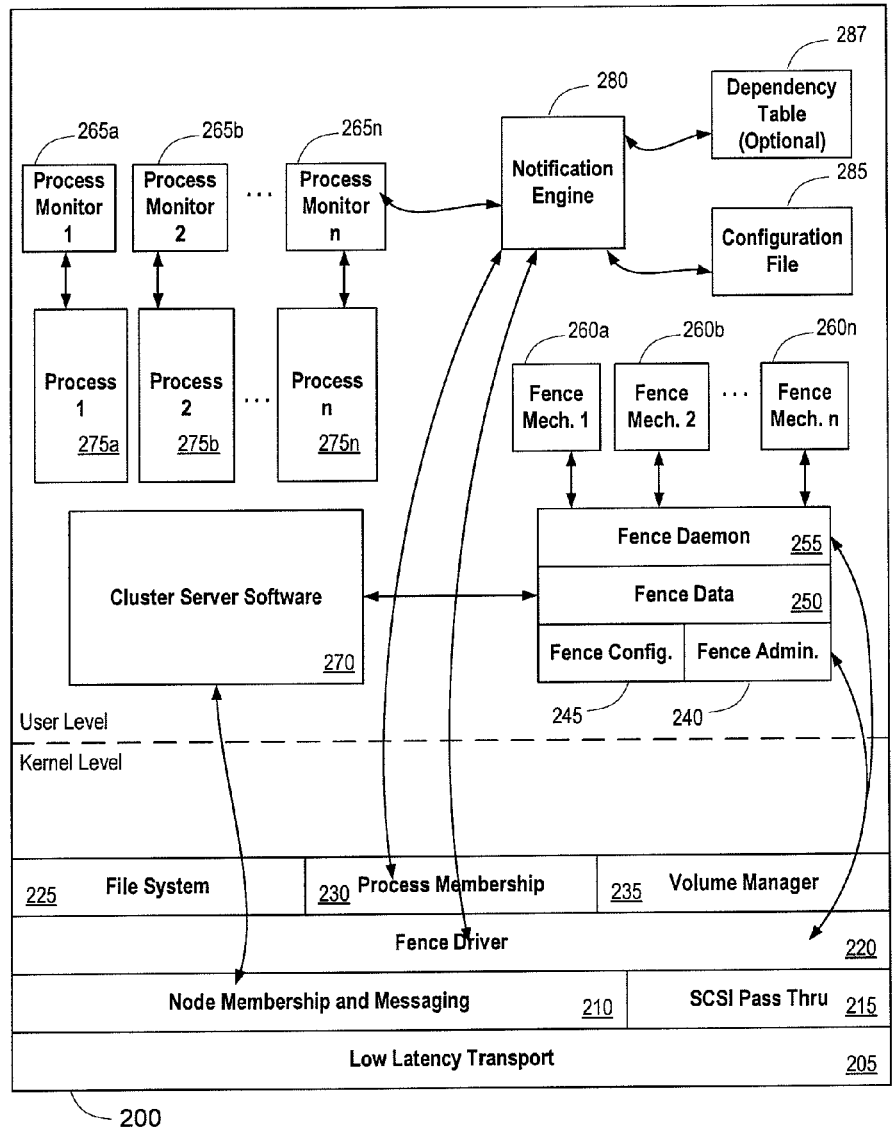
FIG. 2 illustrates some of the software components of a computer system cluster as executed on one node of the cluster.
FIG. 2B illustrates an example of a key storage data structure.

FIG. 2A illustrates some of the software components of a computer system cluster as executed on one node of the cluster. The components illustrated include those used to provide a generalized framework within which one or more different I/O fence mechanisms can be employed to protect a computer system cluster and isolation of a failed node or a failed process can be achieved.

Memory 200 is a representative memory space of a cluster node. In general, the software components are divided into those components operating at the kernel level, and those operating at the user level. Kernel level components include some basic software components supporting cluster operation. For example, low latency transport 205 provides high-speed kernel-to-kernel communications and monitors network connections between nodes. Node membership and messaging 210 is a kernel component that maintains and monitors node membership in the cluster. Node membership and messaging 210 can also provide a messaging mechanism to other software components, e.g., file system 225, process membership 230, volume manager 235, and cluster server software 270. Alternatively, the functions performed by node membership and messaging 210 could be performed by software operating at the user level. SCSI pass through 215 is an example of a hardware driving component for sending SCSI commands from other components to SCSI devices, such as the data disks in devices 180 and 190 and certain coordinator resources used by I/O fence mechanisms that are designed to receive SCSI commands, i.e., SCSI-2 and SCSI-3 compliant devices.

Fence driver 220 operates in conjunction with fence daemon 255 and various fence mechanisms 260a-n to prevent ejected cluster nodes, i.e., nodes that have lost cluster membership because of some connectivity failure, from accessing shared storage resources, causing data corruption, or otherwise disrupting expected cluster behavior (e.g., shared-nothing cluster operation). For example, fence driver 220 receives node membership information either directly or indirectly from node membership and messaging component 210. Once node membership and messaging 210 learns that communication with another cluster node has been lost, i.e., that the cluster has partitioned, it can directly inform fence driver 220, which in turn begins taking action to protect shared resources.

Alternately, node membership and messaging 210 informs other kernel components such as file system 225, process memberships 230, or volume manager 235, that communication with another cluster node has been lost. Subsequent communication between the informed kernel component(s) and fence driver 220 is the mechanism by which partition event information is passed to fence driver 220. For example, upon receiving cluster membership change information from component 210, a component such as process membership 230 can query fence driver 220 to determine whether it is safe, e.g., the split-brain condition has been resolved, to process membership change information. Fence driver 220 will not typically allow process membership 230 to proceed until fencing operations are sufficiently complete. File system kernel component 225 provides and/or supports additional (beyond typical operating system file system capabilities) file system features including for example: quick-recovery, journaling, backup without data lock out, and online file system resizing. Process membership component 230 monitors and controls the membership of processes in the node and ensures that information on current member processes remains the same on all cluster nodes. Volume manager 235 enables physical resources configured in the cluster to be managed as logical devices or volumes.

Those having ordinary skill in the art will readily recognize that a variety of different additional kernel components can be (and typically are) utilized by a cluster node. Many of the components described above as well as some of the user level components described below are part of one or more of the VERITAS Volume Manager™, VERITAS File System™, and VERITAS Cluster Server™ products provided by VERITAS Software Corporation.

Fence driver 220, fence daemon 255, and fence mechanisms 260 and 265, can operate in conjunction with fence configuration software 245, fence administration software 240, and fence data 250. For example, fence configuration software 245 can be used by a system operator to specify and initialize information stored in a coordinator resource, e.g., which nodes are part of the cluster, as well as to configure fence driver 220 and fence daemon 255. For those devices to which an attached volume maps, volume manager 235 can issue to SCSI pass through 215 commands for reading and displaying keys, registering keys or key sets with devices by storing the key or key set on the device, making a reservation with a device, removing registrations made by other devices, reading reservations, and removing registrations (also called de-registering). In some embodiments, a key set comprises both a shared coordinator resource key and a group of shared data resource keys. Together with fence driver 220, fence daemon 255, and fence mechanisms 260 and 265, components 240, 245, and 250 provide core functionality for the I/O fencing services used to prevent data corruption. Note that one or more of components 240, 245, 250, 255, 260, and 265 can be included within other components, and/or several components can be combined.

The user level also typically includes software components such as the previously mentioned cluster server software 270 and processes 275a-n. Processes 275a-n may be embodied as any of a wide variety of applications (e.g., database administration systems (DBMS), file servers, application servers, web servers, backup and restore software, customer relationship management software, and the like) or may be embodied by virtual machines, which simulate the existence of an independent processor providing an independent instance of an operating system for executing applications. On one embodiment, each of processes 275a-n is monitored by one of process monitors 265a-n, which are typically scripts that send commands to processes 275*a-n* and receive the results of those commands as feedback. When the results of such a command indicate a failure of one of processes 275*a-n*, the corresponding one of process monitors 265*a-n* sends a failure signal (also called a trigger) to notification engine 280. A process failure indicator will typically indicate a process failure in spite of the fact that a heartbeat will continue to be received from the node housing the process. Examples of indicators of process failure also include the failure to respond to a 'kill process' command.

Notification engine 280 receives results from process monitors and, in the event of a process failure, informs process membership 230 and fence driver 220. Additionally, notification engine 280 parses a configuration file 285 to identify resources associated with any of processes 275*a-n* that has failed. In some embodiments, notification engine 280 generates during registration of a key and maintains thereafter a dependency table 287 that contains an identification of the resources associated with processes 275*a-n*. Such a dependency table contains mappings between processes and the shared data resources that support the processes and store user data.

Fencing components use one or more coordinator resources to register and de-register keys as part of the I/O fencing operation. The use of coordinator resources enables the fencing components to address failed nodes and failed processes occurring in cluster computer systems.

In general, when a node fails or isolates itself, the resulting condition is called a "split brain" because the failure or isolation of a node can lead separate parts of a cluster to each conclude that they have exclusive access to a shared resource. In general, when a split-brain condition occurs, a designated node in each subcluster, e.g., the lowest numbered node, "races" to gain control of the coordinator resource(s). The winning node remains in the cluster, and fence components are used to fence losing nodes off from the shared data storage and/or remove the nodes from the cluster. This can be accomplished by causing nodes to lose their membership in the cluster, e.g., as reflected in membership records stored in a coordinator resource. The nodes remove themselves from the cluster ("commit suicide") upon recognizing that they have lost membership. In still other examples, nodes are forcibly removed from the cluster by, for example, cycling their power. Ejected systems cannot write to the data disks, and therefore the potential for corrupt data is greatly reduced or eliminated.

In operations in which only a process on a node has failed, however, fencing components are used to fence off only the failed process from the resources associated with the failed process. All nodes will typically remain associated with their coordinator resources. A split-brain is not developed, and no racing to control a coordinator resource is conducted. The selected processes are fenced off from shared resources, prohibiting them from reading or writing to data disks. Ejected processes cannot write to the data disks, and therefore the potential for corrupt data is greatly reduced or eliminated. At the same time, healthy processes executing on the same nodes as the failed processes are allowed to remain in contact with the data disks, and the healthy processes continue to execute. In one embodiment, whether and how to shut down failed processes, once they are isolated from shared data resources such as data disks, is left to the individual node.

In the generalized I/O fence framework illustrated in FIG. 2A, much of the functionality for implementing various I/O fence techniques is contained in each of the fence mechanisms 260*a-n*. In general, each fence mechanism is a separate module, e.g., a separate executable, script, DLL, etc., that is used in conjunction with the other fence components illustrated to implement a particular I/O fencing scheme. Numerous different I/O fence mechanisms can be implemented, some of which are discussed in greater detail below with respect to FIGS. 5A-5B.

Fence mechanisms can be differentiated by the type of coordinator resource or resources used to determine which processes or nodes gain and lose access to shared resources in the cluster. Examples of the different coordinator resources used by fence mechanisms include: SCSI-3 compliant devices where SCSI-3 persistent reservation and registration commands are used to register with and gain control of the devices in order to determine the node or nodes that will remain in the cluster; SCSI-2 compliant devices where SCSI-2 reservation and registration commands are used to register with and gain control of the devices in order to determine the node or nodes that will remain in the cluster; remote access power distribution units that provide power to cluster nodes and can be used to cycle the power or turn nodes off; node hardware and/or software that supports a standard for receiving remote management commands such as the Intelligent Platform Management Interface (IPMI) standard; virtual devices such as specifically defined volumes for use in a manner similar to SCSI devices; management processors or computer systems that are coupled to the cluster but are not nodes of the cluster and provide some cluster management functionality (e.g., the blade management processor of a blade server system); storage area network devices (e.g., switches, routers, etc) that can provide SAN zoning functionality to "zone out" node access to certain storage elements; arbitrator processes operating on a computer system, typically remote from the cluster nodes, control or ownership of which can confer success in a race for the coordinator resource; and contact-response systems where a person or program is contacted (e.g., via e-mail or telephone) and a designated response indicates control of the resource. Numerous other examples of coordinator resources and corresponding fence mechanisms will be known to those having ordinary skill in the art.

Thus, the coordinator resource or resources can include a variety of physical devices, logical devices, processes, and combinations thereof. One of the advantages of the framework illustrated in FIG. 2A is that it can, in general, accommodate any type of fence mechanism. Functionality specific to the particular I/O fencing technique is concentrated in a corresponding I/O fence mechanism (260*a-n*). Fence daemon 255 manages the various fence mechanisms, invokes them as necessary, provides supporting functionality, and interacts with fence driver 220 to, for example, get information about cluster membership and cluster partition conditions. For example, when node membership and messaging 210 receives information indicating that the node has lost contact with another node, it will inform fence driver 220 which in turn communicates with fence daemon 255. Fence daemon 255 operates in association with an appropriate fence mechanism to perform the corresponding fencing operation.

While various fence mechanisms will tend to differ based on differences among the coordinator resources used, fence driver 220, fence daemon 255 and any fence mechanism will typically operate in conjunction with each other to provide one or more of the following functionalities: the ability to generate and compare mechanism comparison information to ensure that the there are no critical differences in the instance/ version of the fence mechanism used by the nodes of a cluster; the ability to join a particular node to a cluster; the ability to register and de-register keys on a coordinator resource for various nodes and processes; the ability to race for the coordinator resource(s) so that only one node can win the race; the ability to fence off data resources that must be protected from possible data corruption from a failed node or process; the ability to unjoin a node from a cluster under certain circumstances (typically when the node gracefully and successfully leaves the cluster); the ability to isolate a process; and the ability to exit a node from the cluster (either in a un-graceful, error-driven situation or in an unjoin situation where there is a related error condition).

In some cases, the manner in which one or more of these functionalities is implemented will be very specific to the fencing technique used by the fence mechanism. For example, the race operation for SCSI-2 or SCSI-3 devices includes the issuing of various SCSI commands to try to gain control of the coordinator resource(s), while the race for control of power distribution units supplying power to nodes of the cluster might simply entail issuing "power off" commands. Similarly, the isolation of a process running on a particular node may simply entail commands to de-register the process by erasing keys stored on the coordinator node that assign a data disk to the process. In other examples, different fence mechanisms may share the same or similar implementation of a particular functionality. Additionally, the type of fence mechanism and/or simple implementation details my dictate how the different system components perform different parts of the needed tasks. In one embodiment, communication between fence daemon 255 and fence driver 220 is performed according to an application programming interface (API). Such communication typically includes instructions to perform certain tasks, e.g., begin race for coordinator resource, and messages about operation status, e.g., race success/failure. Similarly, communication between fence daemon 255 and fence mechanisms can be via API calls or using other techniques well known to those having skill in the art.

Figure 2B:
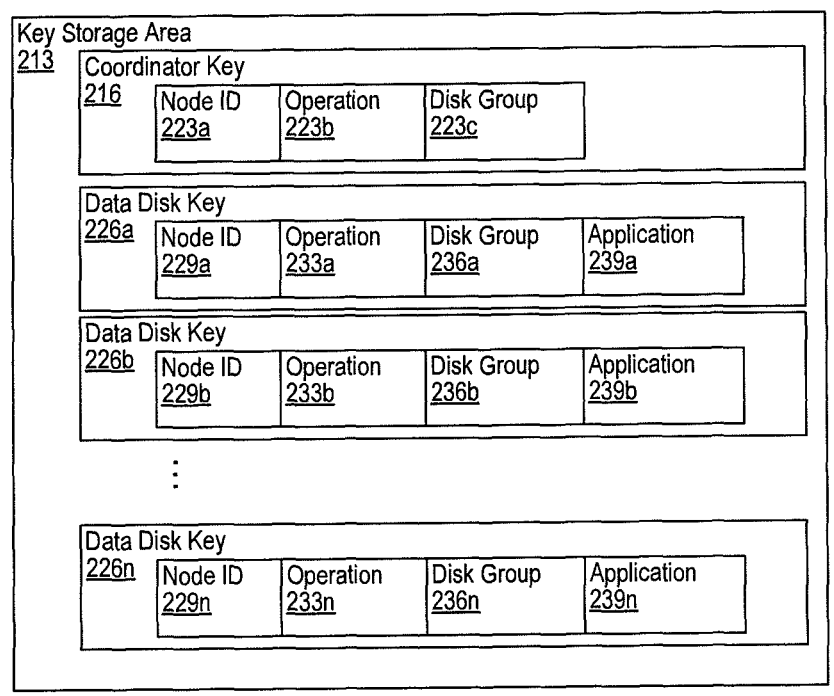
Figure 5A:
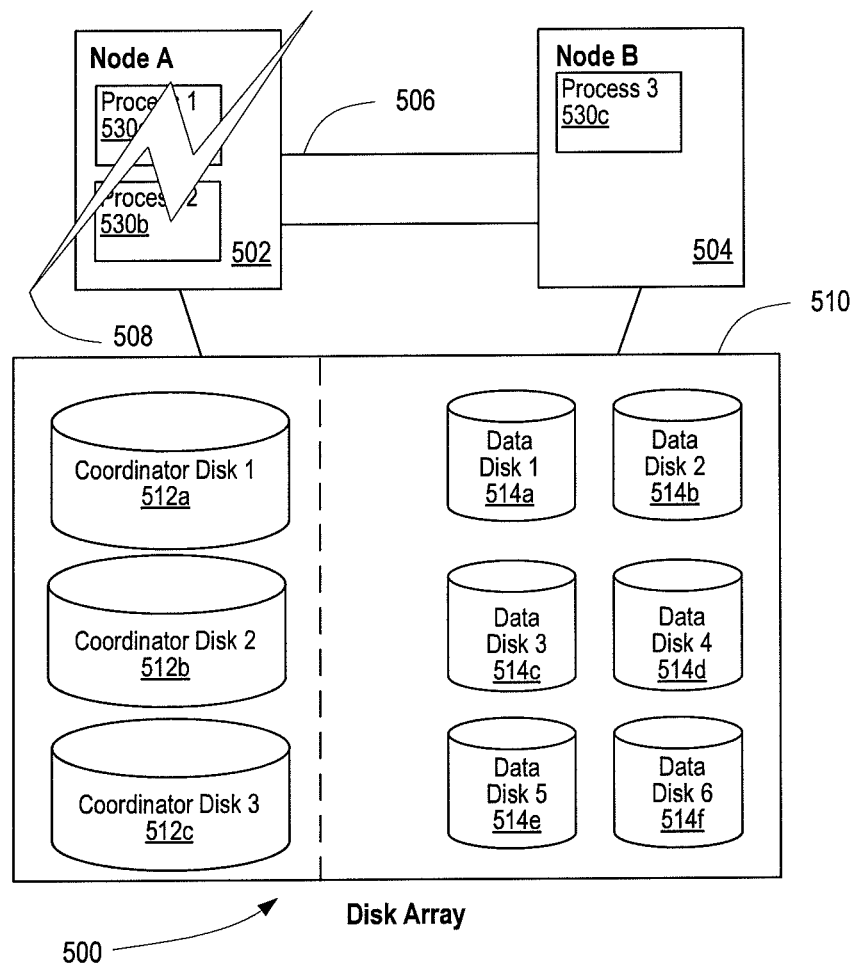
FIG. 5A illustrates an example of an I/O fence mechanism for responding to node-level failure.

FIG. 2B illustrates an example of a key storage data structure. In one embodiment of the present invention, a key storage data structure is used by a node to register and de-register processes and nodes interacting with a coordinator storage disk and data disks. In such an embodiment, a key storage data structure is embodied by a key storage area 213 in a region of memory or disk space on a coordinator storage disk (or, on some alternative embodiments, on an alternative coordinator resource). Referring briefly to FIG. 5A, which is discussed below, in one embodiment, a coordinator resource, such as coordinator disk 1 512a, houses a key storage area similar to key storage area 213 of FIG. 2B.

Key storage area 213 includes a coordinator key 216. A coordinator disk is associated to a node when coordinator key 216 is registered on a coordinator disk by storing coordinator key 216 in key storage area 213. In one embodiment, coordinator key 216 includes a node identifier 223a that associates a node with the coordinator disk on which coordinator key 216 is stored. Coordinator key 216 further includes an operation identifier 223b that associates a node with a protocol version used by the coordinator disk on which coordinator key 216 is stored. Coordinator key 216 also includes a disk group identifier 223c that associates a node with a disk group used by the coordinator disk on which coordinator key 216 is stored.

Key storage area 213 additionally includes shared data resource keys in the form of data disk keys 226a-n. A data disk is an example of a shared data resource associated to a process executing on a node when one of data disk keys 226a-n is registered on a coordinator disk by storing one of data disk keys 226a-n in key storage area 213. In one embodiment, each of data disk keys 226a-n includes node identifiers 229a-n that associates a node with the data disk identified by the respective data disk key 226. Data disk keys 226a-n further include operation identifier 233a-n that associate a data disk with a protocol version used by the data disk identified by the respective data disk key 226. Data disk keys 226a-n also include disk group identifiers 236a-n that associate a data disk with a disk group using the data disk identified by the respective data disk key 226. Data disk keys 226a-n finally include disk application identifiers 239a-n that associate a data disk with a process, such as an application or a virtual machine using the data disk identified by the respective data disk key 226.

Figure 3:
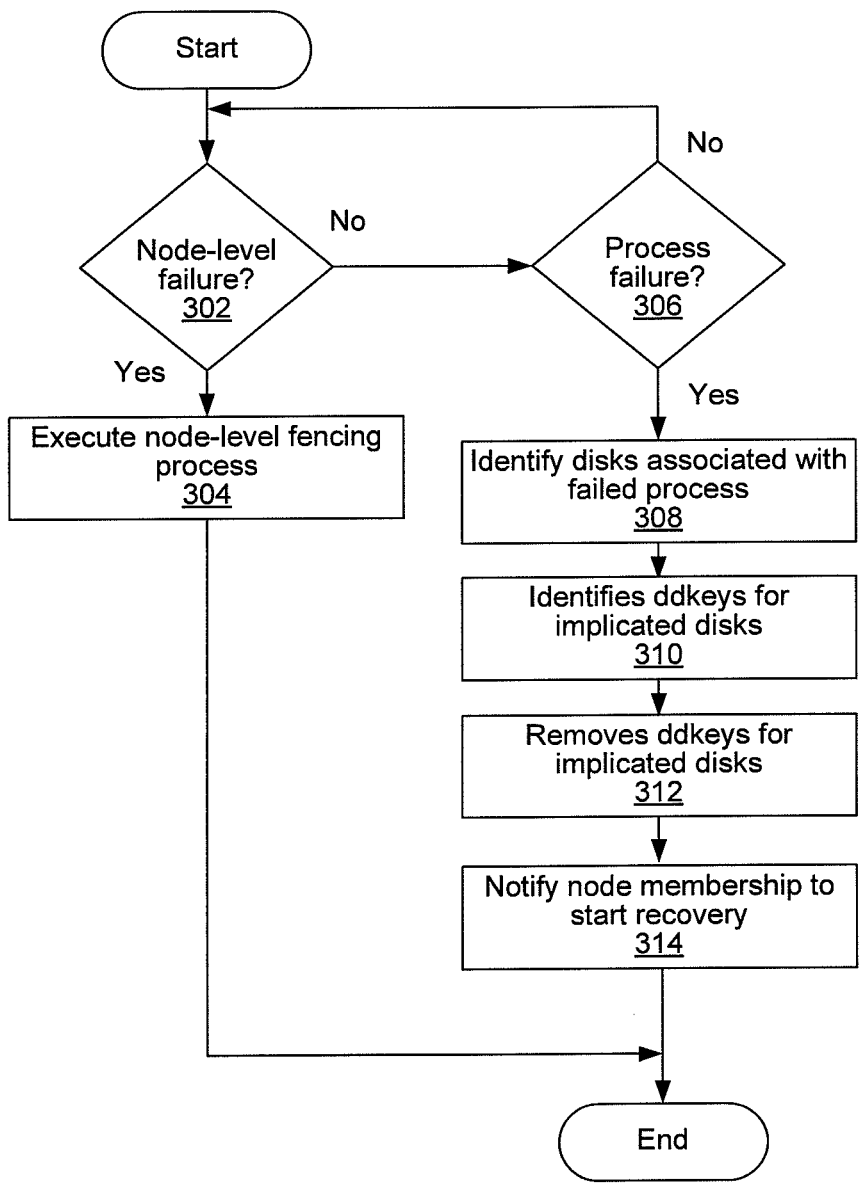
FIG. 3 is a flow chart illustrating some techniques of one embodiment of the present invention.

FIG. 3 is a flow chart illustrating some techniques of the present invention. After starting, the process proceeds to step 302, which depicts detection of a node level failure. Referring briefly to FIG. 1, In one embodiment of the present invention, a failure of a node or, alternatively, a failure of the network links connecting the node to the cluster, is detected through the loss of heartbeat signals across private network 130. If a failure of a node is detected, the process next moves to step 304. Step 304 illustrates the execution of a node-level fencing process. A node level fencing process is explained below in greater detail with respect to FIG. 4. The process then ends.

Returning to step 302, if a node level failure is not detected, the process proceeds to step 306, which depicts detecting a process failure. If no process failure is identified, the process returns to step 302, which is described above. Turning briefly to FIG. 2A, in one embodiment, a failure of a process from among processes 275a-n is detected by one of process monitors 265a-n. Each of processes 275a-n is monitored by one of process monitors 265a-n, which are typically scripts that send commands to processes 275a-n and receive the results of those commands as feedback. When the results of such a command indicate a failure of one of processes 275a-n, the corresponding one of process monitors 265a-n sends a failure signal (also called a trigger) to notification engine 280. Notification engine 280 receives results from process monitors and, in the event of a process failure, informs process membership 230 and fence driver 220.

Returning to FIG. 3 and step 306, if a process failure is identified, the process next moves to step 308. Step 308 illustrates identifying data disks associated with a failed process. Referring briefly to FIG. 2, in one embodiment of the present invention, notification engine 280 parses a configuration file 285 to identify resources associated with any of processes 275a-n that has failed. In alternative embodiments, notification engine 280 maintains a dependency table 287 that contains an identification of the resources associated with processes 275a-n, and reference to dependency table 287 is made, rather than parsing configuration file 285.

Returning to FIG. 3, the process next proceeds to step 310, which depicts identifying data disk keys associated with a failed process. Referring briefly to FIG. 2A and FIG. 2B, in one embodiment, one or more of fence mechanisms 260a-n will contact a coordinator disk and read the key storage data structure housed in key storage area 213. Specifically, one or more of fence mechanisms 260a-n will read the application identifiers 239a-n of data disk keys 226a-n to identify data disk keys associated with a failed process. In one embodiment, this identification is accomplished with a READ KEYS command set to identify a particular pattern in the process identifier associated with a failed process.

Returning to FIG. 3, the process then moves to step 312, which depicts removal of data disk keys associating data disks with the failed process. Referring briefly to FIG. 2A and FIG. 2B, in one embodiment, one or more of fence mechanisms 260a-n will contact a coordinator disk and delete from the key storage data structure embodied by key storage area 213 any of data disk keys 226a-n containing application identifiers 239a-n identifying data disk keys associated with a failed process. In one embodiment, this identification is accomplished with a READ KEYS command set to identify a particular pattern in the process identifier associated with a failed process. Coordinator key 216 will remain registered and will not be deleted. Similarly, any of data disk keys 226a-n containing application identifiers 239a-n that do not identify data disk keys associated with a failed process will remain registered and will not be deleted.

Returning to FIG. 3, the process next moves to step 314. Step 314 illustrates notifying node membership to start recovery of resources for which keys have been deleted in step 312. The process then ends. Such a notification is performed through an interprocess (IPC) call or through a command directed to a command-line interface.

Figure 4:
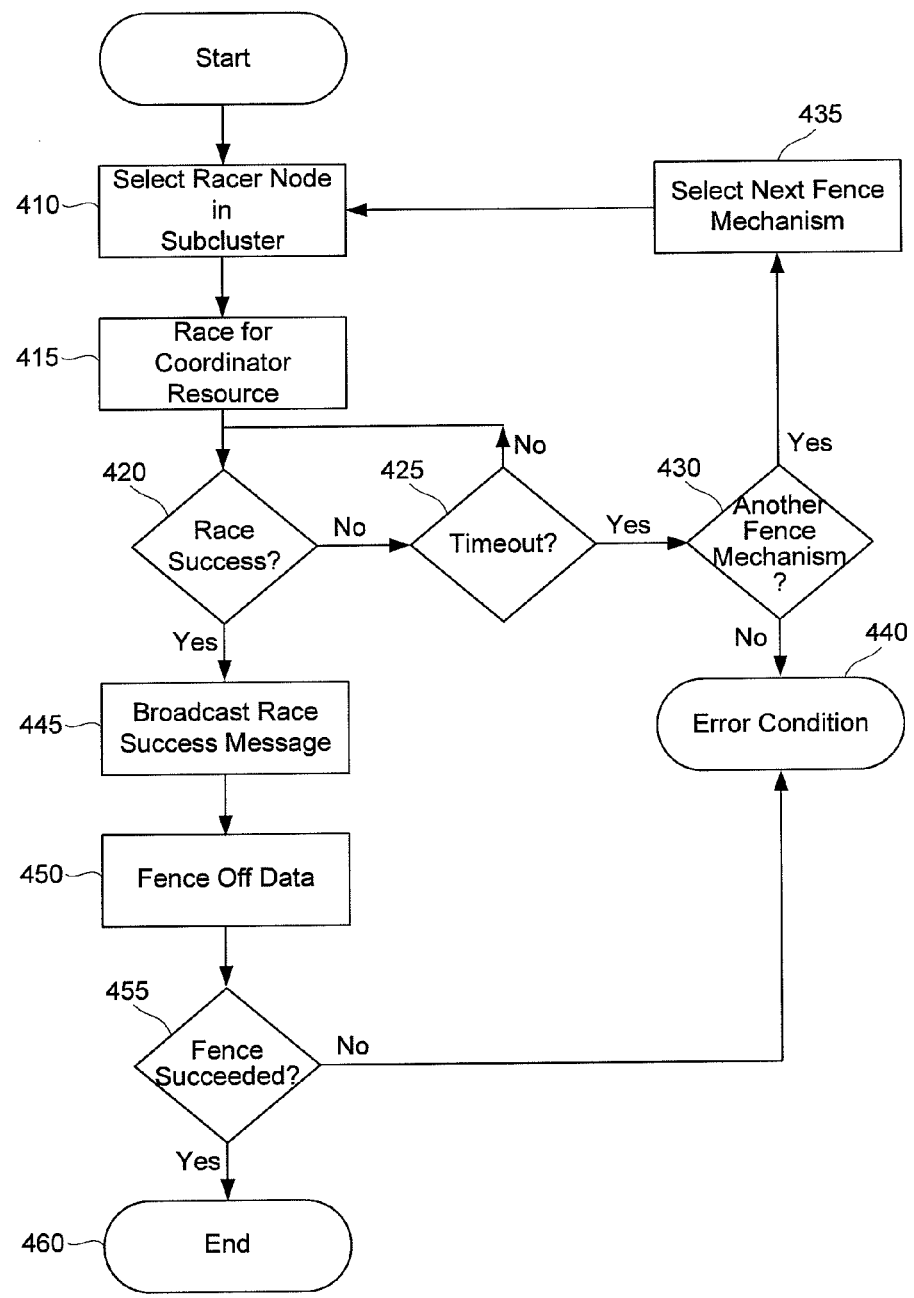
FIG. 4 is a flow chart illustrating still other techniques of one embodiment of the present invention.

FIG. 4 illustrates an example of operation of fence components responding to node level failure, as mentioned in step 304 of FIG. 3. After starting in response to detection of a failure of a node or a connection to a node, the process proceeds to step 410, which depicts a racer node being selected to "race for control" of each subcluster created by failure of a node or the loss of cluster communication. In a two node cluster, there will only be one node in each subcluster, so the determination in 410 is trivial or not performed at all. In subclusters with more than one node, one node is elected or designated as the node that will perform the race for the coordinator resource(s). Such selection can be based on node information, such as a node identifier stored in a coordinator disk key. For example, the node in the subcluster with the smallest node ID can be selected as the racer. Numerous other techniques can be used to select the racer node, as will be understood by those having ordinary skill in the art.

In 415, the racer node races for the coordinator resource, such as a coordinator disk, designated by the fence mechanism in use. Next, a determination is made at step 420 as to whether the node has successfully gained control of the coordinator resource. If not, operation transitions to 425 where a timeout determination is made. For example, a given node's authorization to act as the racer may be limited by a requirement that it must succeed within a given time period. Such a feature is particularly useful where there are multiple nodes in a subcluster and it may be desirable to allow another node to operate as the racer after a certain time period. In another example, the timeout period is used to facilitate implementation of multiple fence mechanisms in the same cluster system. Thus, if a timeout period has occurred, operation can proceed to 430 where it is determined whether another fence mechanism is available. For example, a cluster can be configured to use a primary fence mechanism, e.g., SCSI-3 devices, and a secondary fence mechanism, e.g., power distribution units, in the event that the first mechanism fails to work properly. Alternatively, multiple fence mechanisms can be used in parallel (not illustrated). If there is another fence mechanism to use, operation transitions to 435 where that mechanism is selected. Operation then returns to 410 to proceed using the alternate mechanism. If there are no further mechanisms to be used, an error condition occurs (440). In many implementations, only one fence mechanism will be available, and there will be no need to perform operations like those illustrated at 430 and 435. Moreover, for a given race mechanism, there will typically be only one racer node in a given subcluster and if that racer node fails to win the race for any reason, all nodes in that subcluster will be ejected. In still other examples, expiration of a timeout time period can cause an error condition to occur.

If the node succeeds in gaining control of the coordinator resource, operation transitions to 445 where the winning node informs other nodes of its success. Those nodes may take subsequent action based on such a "race success" message. Next, on step 450, the winning node takes any additional steps necessary to fence off data and protect it from corruption, such as deleting coordinator disk keys and data disk keys associated with a failed node. Referring briefly to FIG. 2A and FIG. 2B, one or more of fence mechanisms 260a-n will read the node identifiers 223a and 226a-n of coordinator key 216 and data disk keys 226a-n, respectively, to identify coordinator disk keys and data disk keys associated with the failed node. One or more of fence mechanisms 260a-n will contact a coordinator disk and delete from the key storage data structure housed in key storage are 213 any of data disk keys 226a-n or coordinator key 216 containing node identifiers 223a and 226a-n identifying keys associated with a failed node.

In step 455, a determination is made whether the data fencing has been successful. This might include confirming that any nodes from "losing" subclusters are unregistered from a coordinator device, ensuring that only nodes in the winning subcluster have access to the data, and the like. Although not illustrated, this process can also include steps similar to those illustrated at 425, 430, and 435. Thus, there may be a timeout associated with the data fencing step (e.g., when this process is explicitly separate from the race process) and there can also be multiple data fencing mechanisms to try. If the fence has failed, an error condition has occurred (440) and subsequent steps can be performed as described above. If the fence has succeeded that the remaining nodes can resume normal operation and the process ends (460).

FIG. 5A is a simplified block diagram of a two node cluster experiencing a node-level failure. For convenience, various cluster elements such as clients are not shown. In this example, cluster 500 is configured for failover operation. A failover service only runs on one node at a time. If the node running the service fails, the service will be restarted on another node in the cluster. Thus, for example, node A 502 is executing some user applications, labeled as processes 530a-b and node B 504 stands by and executes a standby process 530c in the event that node A fails. Each of nodes 502 and 504 is coupled to disk array 510 that includes a number of data disks 514a-f and three coordinator disks 512a-c. Thus, in the example of FIG. 5A, coordinator disks 512a-c serve as the shared coordinator resources used by a corresponding fence mechanism. If coordinator disks 512a-c are SCSI-2 disks, then a SCSI-2 based fence mechanism can be implemented where nodes accessing the coordinator disks 512a-c are allowed to reserve a disk drive using the SCSI-2 "reserve" command and subsequently release the disk drive for use by another device via the "release" command. If coordinator disks 512a-c are SCSI-3 compliant devices, the more robust persistent reservation commands can be used. The following example outlines the use of a SCSI-3 fencing technique and makes reference to steps described in FIGS. 3 and 4.

The following registration steps can be performed before, during, or after a cluster join operation. A node (e.g., node A 502) registers with the designated coordinator disks 512a-c using the PERSISTENT OUT-REGISTER command and stores coordinator disk keys in key storage areas on coordinator disks 512a-c. Alternately, registration can occur manually when a system administrator configures the system. For example, a system administrator starts an application on node A, such as process 1 530a using appropriate cluster server software. Alternately, this step can be performed as part of an automatic start-up process. Node A then registers with the data disks 514 in storage array 510 by issuing a PERSISTENT OUT-REGISTER command on the path between the node and storage array 510 using a registration key, e.g., "K1." Node A 502 checks if other nodes are registered with any of the data disks 514 using the PERSISTENT IN-READ KEYS command.

Next, node A 502 prevents data disks 514 from accepting I/Os from other nodes by issuing a PERSISTENT OUT-RESERVE with a "write exclusive-registrants only" (WXRO) reservation and placing data disk keys in key storage areas on coordinator disks 512a-c. This means that data disks 514a-f will only accept write requests from a registered node. A node which is not registered and attempting to write to the disk will receive a SCSI RESERVATION CONFLICT error. Any cluster applications can now proceed normally. For example, a database contained one or more of data disks 514a-f is started on node A. Node A 502 reads and writes to the data disks normally.

When Node A 502 has failed (508), the two nodes lose contact with each other. Node B 504 will then unregister Node A 502 from the coordinator disks 512a-c using the PERSISTENT OUT-PREEMPT AND ABORT.

To perform that task, node B 504 sends PERSISTENT OUT-REGISTER commands to each coordinator disks 512a-c using node B's key, e.g., "K2". In general, the commands to each disk are sent in parallel. This task is performed because node B 504 has not previously registered with data disks 512a-c. Node B 504 can then issue PERSISTENT IN-READ KEYS commands to determine the keys registered with respect to data disks 514a-f. If any of the data disks have a key not belonging to node B 504, e.g., not K2, node B 504 can then issue PERSISTENT OUT-PREEMPT and ABORT commands with respect to the appropriate data disks 514a-f with a victim key value corresponding to that read in the previous command. In this example, node B 504 finds that node A (key K1) is still registered, and accordingly unregisters node A 502 by deleting the key for node A 502. Thus, node B 504 takes over operation with an I/O fence in place. At this point additional action can be taken by node B 504. For example, node B can prevent data disks 514a-f from accepting I/Os from other nodes by issuing a PERSISTENT OUT-RESERVE with a "write exclusive—registrants only" (WXRO) reservation.

Figure 5B:
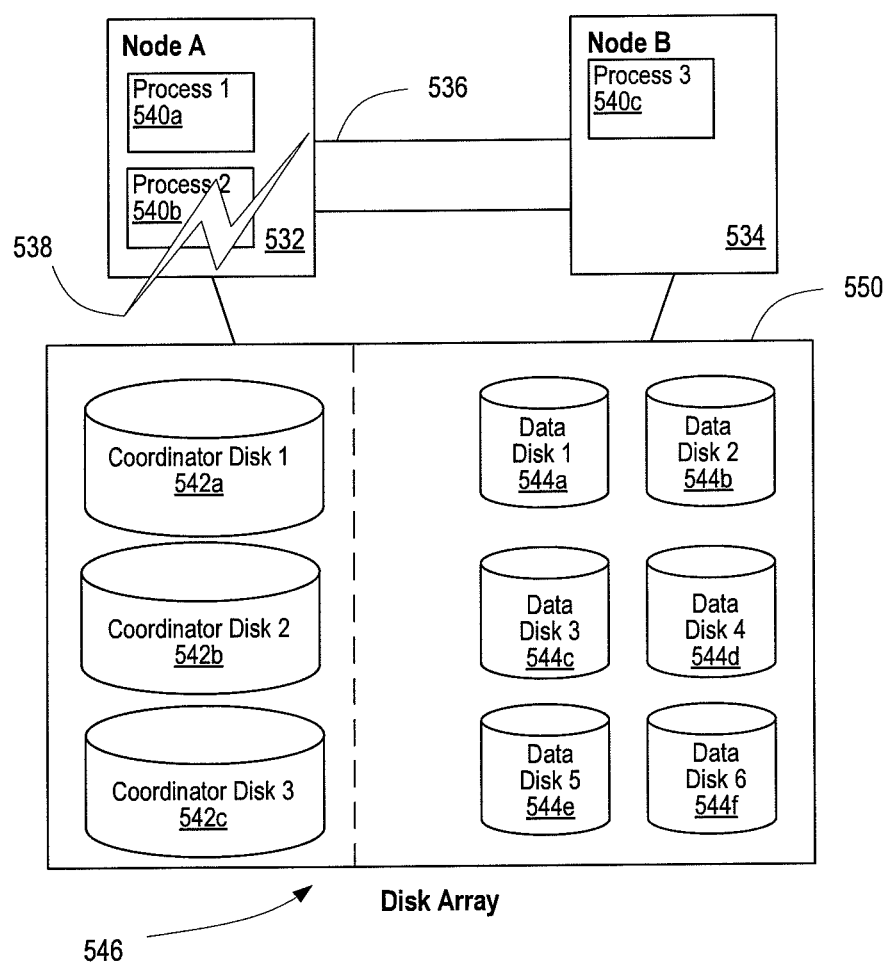
FIG. 5B illustrates an example of an I/O fence mechanism for responding to process-level failure.

FIG. 5B is a simplified block diagram of a two node cluster experiencing a process-level failure. For convenience, various cluster elements such as clients are not shown. In this example, cluster 546 is configured for failover operation. A failover service only runs on one node at a time. If the node running the service fails, the service will be restarted on another node in the cluster. Thus, for example, node A 532 is executing some user applications, labeled as processes 540a-b and node B 534 stands by and executes a standby process 540c in the event that node A 532 fails. Each of nodes 532 and 534 is coupled to disk array 550 that includes a number of data disks 544a-f and three coordinator disks 542a-c.

In this example, coordinator disk 1 542a, is registered to node A 532. Data disk 1 544a and data disk 2 544b are registered to process 1 540a. Similarly, coordinator disk 2 542b is registered to node A 532. Data disk 3 544c and data disk 4 544d are registered to process 2 540b. Likewise, coordinator disk 3 542c is registered to node B 534. Data disk 5 544e and data disk 6 544f are registered to process 3 540c.

Thus, in the example of FIG. 5B, coordinator disks 512a-c serve as the coordinator resources used by a corresponding fence mechanism. If coordinator disks 542a-c are SCSI-2 disks, then a SCSI-2 based fence mechanism can be implemented where nodes accessing the coordinator disks 542a-c are allowed to reserve a disk drive using the SCSI-2 "reserve" command and subsequently release the disk drive for use by another device via the "release" command. If coordinator disks 542a-c are SCSI-3 compliant devices, the more robust persistent reservation commands can be used. The following example outlines the use of a SCSI-3 fencing technique and makes reference to steps described in FIGS. 3 and 4.

The following registration steps can be performed before, during, or after a cluster join operation. A node (e.g., node A 532) registers with the designated coordinator disks 542a-b using the PERSISTENT OUT-REGISTER command and stores coordinator disk keys in key storage areas on coordinator disks 542a-b. Similarly, node B 534 registers with the designated coordinator disks 542c using the PERSISTENT OUT-REGISTER command and stores coordinator disk keys in key storage area on coordinator disks 542c. Node A 532 then registers with the data disks 544a-d in storage array 550 by issuing a PERSISTENT OUT-REGISTER command on the path between the node and storage array 510 using a registration key, e.g., "K3." Node B 534 then registers with the data disks 544e-f in storage array 550 by issuing a PERSISTENT OUT-REGISTER command on the path between the node and storage array 510 using a registration key, e.g., "K4."

Next, node A 532 prevents data disks 514a-d from accepting I/Os from other nodes by issuing a PERSISTENT OUT-RESERVE with a "write exclusive-registrants only" (WXRO) reservation and placing data disk keys in key storage areas on coordinator disks 542a-b. This means that data disks 544a-d will only accept write requests from a registered node. Node B 534 prevents data disks 514e-f from accepting I/Os from other nodes by issuing a PERSISTENT OUT-RESERVE with a "write exclusive-registrants only" (WXRO) reservation and placing data disk keys in key storage areas on coordinator disk 542c. This means that data disks 544e-f will only accept write requests from a registered node. A node which is not registered and attempting to write to the disk will receive a SCSI RESERVATION CONFLICT error. Any cluster applications can now proceed normally.

Once process 2 540b on Node A 532 has failed (538), process 2 540b will be unregistered from coordinator disks 542b using the PERSISTENT OUT-PREEMPT AND ABORT. Processes 540b-c continue to operate and their keys remain registered. Similarly, coordinator keys for both Node A 532 and node B 534 remain registered.

To perform that task, a PERSISTENT OUT-REGISTER command is sent to coordinator disks 542b using node A's key, e.g., "K3". A node can then issue PERSISTENT IN-READ KEYS commands to determine the keys registered with respect to data disks 544a-f. If any of the data disks have a key belonging to process 2 540b, a node can then issue PERSISTENT OUT-PREEMPT and ABORT commands with respect to the appropriate data disks 544c-d with a victim key value corresponding to that read in the previous command. At this point additional action can be taken. For example, a node can prevent data disks 544c-d from accepting I/Os from other process 2 540b by issuing a PERSISTENT OUT-RESERVE with a "write exclusive-registrants only" (WXRO) reservation. The registrations of coordinator disks 542a-c and data disks 504a, b, e and f remain unchanged.

Figure 6:
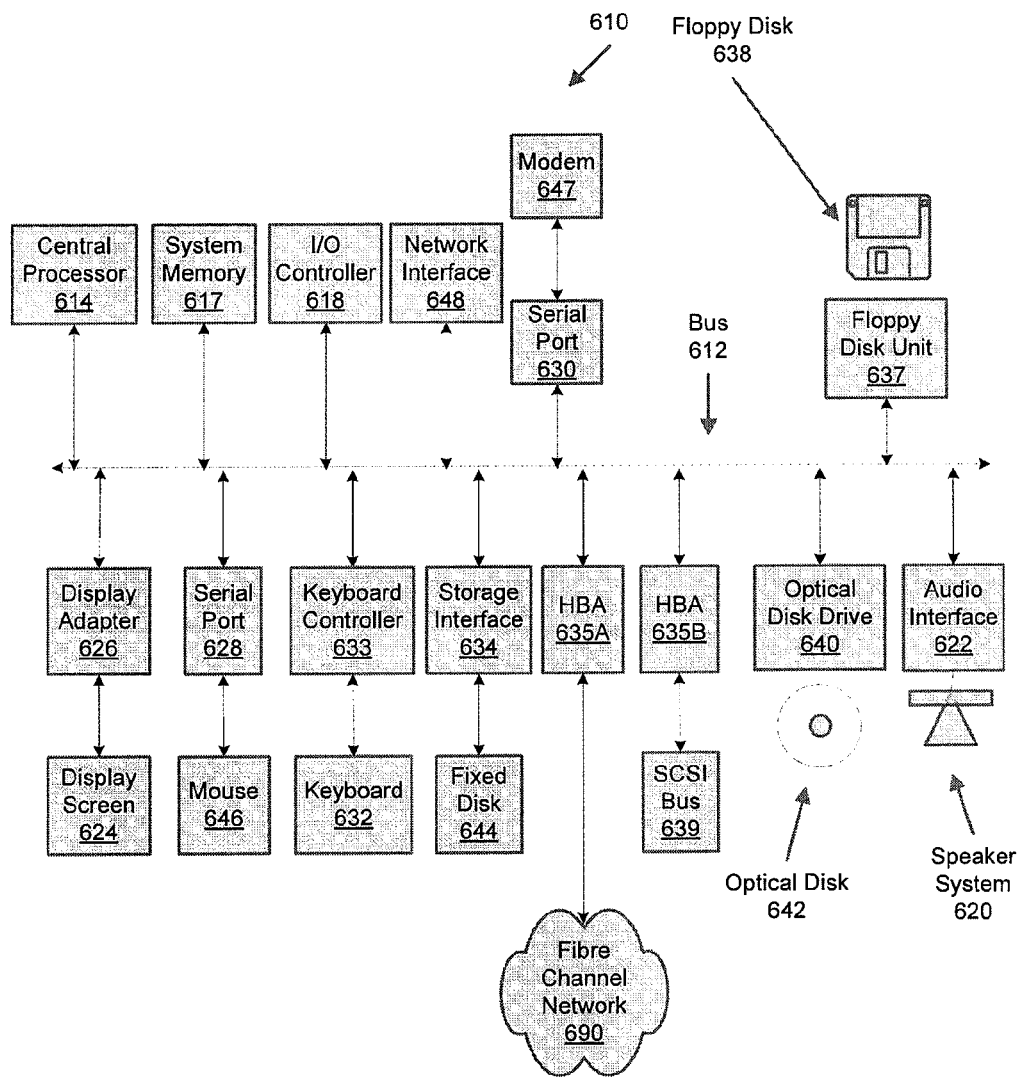
FIG. 6 is a block diagram of a computer system for implementing the techniques of the present invention.

FIG. 6 depicts a block diagram of a computer system 610 suitable for implementing a server (e.g., server A 110 of FIG. 1), as well as the clients (e.g., clients 140 of FIG. 1) used therein. Computer system 610 includes a bus 612, which interconnects major subsystems of computer system 610, such as a central processor 614, a system memory 617 (typically random-access memory (RAM), but which may also include read-only memory (ROM), flash ROM, or the like), an input/output controller 618, an external audio device, such as speaker system 620 via an audio output interface 622, an external device, such as a display screen 624 via display adapter 626, serial ports 628 and 630, a keyboard 632 (interfaced with keyboard controller 633), a storage interface 634, a floppy disk drive 637 operative to receive a floppy disk 638, a host bus adapter (HBA) interface card 635A operative to connect with a Fibre Channel network 690, a host bust adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown) and random access memory (RAM) (not shown), as previously noted. RAM is generally the main memory into which OS and application programs are loaded. ROM or flash memory can contain, among other code, the Basic Input-Output system (BIOS) which controls basic hardware operation such as the interaction with peripheral components. Applications resident with computer system 610 are generally stored on and accessed via a computer-readable storage medium, such as hard disk drive (e.g., fixed disk 644), an optical drive (e.g., optical drive 640), a floppy disk unit 637.

Storage interface 634, as with other storage interfaces of computer system 610, can connect to a standard computer-readable storage medium for storage and/or retrieval of information, such as a fixed disk drive 644. Fixed disk drive 644 may be a part of computer system 610, or may be separate and accessed through other interface systems. Modem 647 can be employed to provide a direct connection to a remote server via a telephone link or to the Internet via an interne service provider (ISP). Network interface 648 may provide a direct connection to a remote server via a direct network link to the Internet via a point-of-presence (POP). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present. The devices and subsystems can be interconnected in different ways from that shown in FIG. 6. The operation of the computer system such as that shown in FIG. 6 is readily known in the art and is not discussed in detail in this application. Code to implement the previously-described features can be stored in computer-readable storage media such as one or more of system memory 617, fixed disk 644, optical disk 642, or floppy disk 638. The OS provided on computer system 610 can be, for example, MS-DOS®, MS-WINDOWS®, OS/2®, UNIX®, Linux®, or other known OS.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method, comprising,
registering a key set, wherein
the registering the key set comprises registering a first shared data resource key,
the first shared data resource key comprises a first identifier associating a first process executing on a first node with a first shared data resource, and a fourth identifier associating the first node with the first shared data resource,
the registering the key set further comprises registering a second shared data resource key, and
the second shared data resource key comprises a second identifier associating a second process executing on the first node with a second shared data resource, and a fifth identifier associating the first node with the second shared data resource; and
in response to a detection of a failure of the first process, de-registering the first shared data resource key, wherein the second shared data resource key remains registered after the de-registering the first shared data resource key, and wherein the second process continues to operate on the first node after the detection of the failure of the first process;
in response to a detection of a failure of the first node, de-registering the first and second shared data resource keys.

2. The method of claim 1, further comprising
in response to detecting a failure of a node, de-registering a shared coordinator resource key associated with a shared coordinator resource.

3. The method of claim 1, wherein
the registering the key set further comprises generating a data structure comprising
a first mapping between the first process and the first shared data resource, and
a second mapping between the second process and the second shared data resource, and
the registering the key set further comprises storing on a shared coordinator resource
the first shared data resource key, and
the second shared data resource key.

4. The method of claim 2, wherein
the detecting the failure of the node comprises detecting a loss of a heartbeat signal,
the heartbeat signal is transmitted across a private network connection, and
the heartbeat signal is from the node.

5. The method of claim 1, wherein
- a shared coordinator resource key remains registered after the de-registering the first shared data resource key in response to the detection of the failure of the first process,
- the shared coordinator resource key is de-registered in response to the detection of the failure of the first node,
- the first shared data resource stores first user data, and
- the second shared data resource stores second user data.

6. The method of claim 1, wherein
- the detection of the failure of the first process comprises detecting a process failure indicator associated with the failure of the first process.

7. The method of claim 6, wherein
- the registering the key set further comprises registering a shared coordinator resource key,
- the shared coordinator resource key comprises a third identifier associating the first node with the shared coordinator resource,
- the process failure indicator is a failure of the first process to respond to a kill process command.

8. A computer system comprising:
- at least one processor;
- a computer-readable storage medium coupled to the at least one processor; and
- computer code, encoded in the computer-readable storage medium, configured to cause
  - the at least one processor to perform
    - registering a key set, wherein
      - the registering the key set comprises registering a first shared data resource key,
      - the first shared data resource key comprises a first identifier associating a first process executing on a first node with a first shared data resource, and a fourth identifier associating the first node with the first shared data resource,
      - the registering the key set further comprises registering a second shared data resource key, and
      - the second shared data resource key comprises a second identifier associating a second process executing on the first node with a second shared data resource, and a fifth identifier associating the first node with the second shared data resource; and
    - in response to the detection of the failure of the first process, and in response to a determination that the second process continues to operate on the first node after the detection of the failure of the first process, de-registering the first shared data resource key, wherein the second shared data resource key remains registered after the de-registering the first shared data resource key;
    - in response to a detection of a failure of the first node, de-registering the first and second shared data resource keys.

9. The computer system of claim 8, wherein the computer code, encoded in the computer-readable storage medium, is further configured to cause the at least one processor to perform
- in response to detecting a failure of a node, de-registering a shared coordinator resource key associated with a shared coordinator resource.

10. The computer system of claim 8, wherein
- the registering the key set further comprises generating a data structure comprising
  - a first mapping between the first process and the first shared data resource, and
  - a second mapping between the second process and the second shared data resource, and
- the registering the key set further comprises storing on a shared coordinator resource
  - the first shared data resource key, and
  - the second shared data resource key.

11. The computer system of claim 9, wherein
- the detecting the failure of the node comprises detecting a loss of a heartbeat signal,
- the heartbeat signal is transmitted across a private network connection, and
- the heartbeat signal is from the node.

12. The computer system of claim 8, wherein
- a shared coordinator resource key remains registered after the de-registering the first shared data resource key in response to the detection of the failure of the first process,
- the shared coordinator resource key is de-registered in response to the detection of the failure of the first node,
- the first shared data resource stores first user data,
- the second shared data resource stores second user data.

13. The computer system of claim 8, wherein
- the detection of the failure of the first process comprises detecting a process failure indicator associated with the failure of the first process.

14. The computer system of claim 13, wherein
- the registering the key set further comprises registering a shared coordinator resource key,
- the shared coordinator resource key comprises a third identifier associating the first node with the shared coordinator resource,
- the process failure indicator is a failure of the first process to respond to a kill process command, and
- the method further comprises, in response to the detecting a failure of the first node, de-registering the second data disk key.

15. A non-transitory computer-readable storage medium comprising computer code, such that, when executed, the computer code is configured to cause a processor to
- register a key set, wherein
  - the registering the key set comprises registering a first shared data resource key,
  - the first shared data resource key comprises a first identifier associating a first process executing on a first node with a first shared data resource, and a fourth identifier associating the first node with the first shared data resource,
  - the registering the key set further comprises registering a second shared data resource key, and
  - the second shared data resource key comprises a second identifier associating a second process executing on the first node with a second shared data resource, and a fifth identifier associating the first node with the second shared data resource; and
- in response to a detection of a failure of the first process, and in response to a determination that the second process continues to operate on the first node after the detection of the failure of the first process, de-registering the first shared data resource key, wherein the second shared data resource key remains registered after the de-registering the first shared data resource key;
- in response to a detection of a failure of the first node, de-registering the first and second shared data resource keys.

16. The non-transitory computer-readable storage medium of claim 15, wherein the computer code is further configured to cause a processor to
   in response to detecting a failure of a node, de-registering a shared coordinator resource key associated with a shared coordinator resource.

17. The non-transitory computer-readable storage medium of claim 15, wherein
   the registering the key set further comprises generating a data structure comprising
      a first mapping between the first process and a first shared data resource, and
      a second mapping between the second process and the second shared data resource, and
   the registering the key set further comprises storing on the shared coordinator resource
      the first shared data resource key, and
      the second shared data resource key.

18. The non-transitory computer-readable storage medium of claim 16, wherein
   the detecting the failure of the node comprises detecting a loss of a heartbeat signal,
   the heartbeat signal is transmitted across a private network connection, and
   the heartbeat signal is from the node.

19. The non-transitory computer-readable storage medium of claim 15, wherein
   a shared coordinator resource key remains registered after the de-registering the first shared data resource key in response to the detection of the failure of the first process,
   the shared coordinator resource key is de-registered in response to the detection of the failure of the first node,
   the first shared data resource stores first user data,
   the second shared data resource stores second user data.

20. The non-transitory computer-readable storage medium of claim 15, wherein
   the detection of the failure of the first process comprises detecting a process failure indicator associated with the failure of the first process.

21. The computer system of claim 8 wherein the first node is the computer system.

22. The computer-readable storage medium of claim 15 wherein the first node comprises the processor.

\* \* \* \* \*